(12) United States Patent  
Furukubo et al.

(10) Patent No.: US 7,554,340 B2
(45) Date of Patent: Jun. 30, 2009

(54) CAPACITIVE SENSOR

(75) Inventors: Eiichi Furukubo, Kadoma (JP); Hisakazu Miyajima, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 118 days.

(21) Appl. No.: 11/689,663

(22) Filed: Mar. 22, 2007

(65) Prior Publication Data

US 2007/0273393 A1    Nov. 29, 2007

(30) Foreign Application Priority Data

Mar. 28, 2006  (JP) .............................. 2006-089122

(51) Int. Cl.
G01R 27/26 (2006.01)
G01P 15/125 (2006.01)

(52) U.S. Cl. .................................... 324/661; 73/514.32
(58) Field of Classification Search ................. 324/661; 73/514.32
See application file for complete search history.

(56) References Cited

U.S. PATENT DOCUMENTS 6,755,081 B2    6/2004  Furukubo et al.
6,848,320 B2    2/2005  Miyajima et al.
6,990,864 B2 *  1/2006  Sakai ...................... 73/514.32
7,107,847 B2    9/2006  Yoshida et al.
2003/0101817 A1  5/2003  Sakai
2005/0132805 A1  6/2005  Park et al.
2006/0032310 A1  2/2006  Merassi et al.

FOREIGN PATENT DOCUMENTS

EP       1626283      2/2006
JP       2005-83972   3/2005
KR       2003-0045620 6/2003

OTHER PUBLICATIONS

U.S. Appl. No. 10/599,396 to Meshii et al., filed Sep. 27, 2006.
U.S. Appl. No. 11/579,178 to Fukuda et al., filed Oct. 30, 2006.
English Language Abstract of JP 2005-83972.
English language Abstract of KR 2003-0045620, Jun. 11, 2003.

* cited by examiner

*Primary Examiner*—Timothy J Dole
(74) *Attorney, Agent, or Firm*—Greenblum & Bernstein, P.L.C.

(57) ABSTRACT

A capacitive sensor includes an error compensating unit that, in an arrangement that a part of a fixed electrode as an edge portion and a part of a movable electrode as an edge portion are opposed to each other keeping a gap in a direction of shift of a detecting unit, reduces a detection error of capacitance due to the shift of comb-tooth portions from each other in the detecting unit, by a change of capacitance according to variation of the gap caused by the shift.

6 Claims, 5 Drawing Sheets

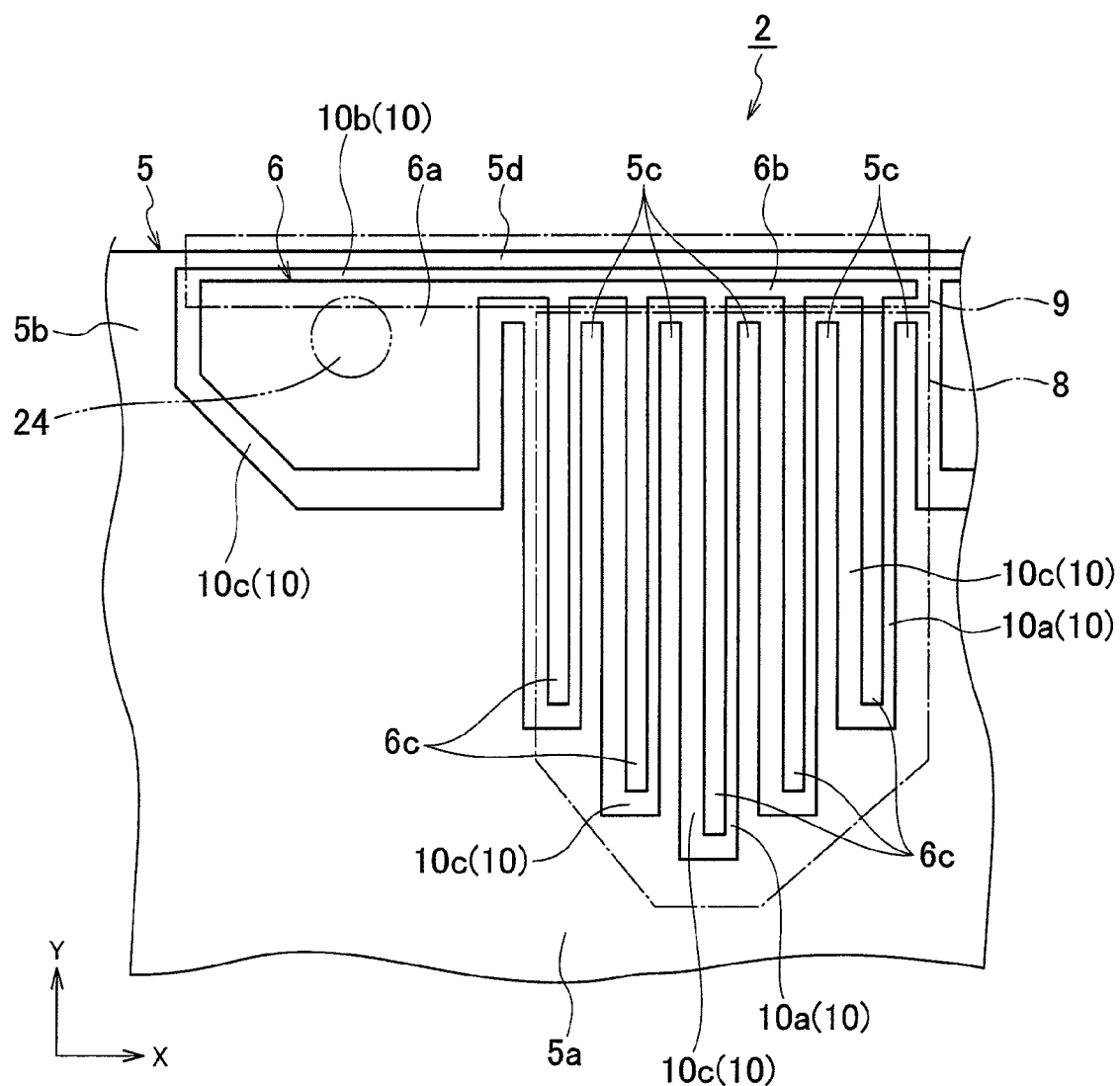

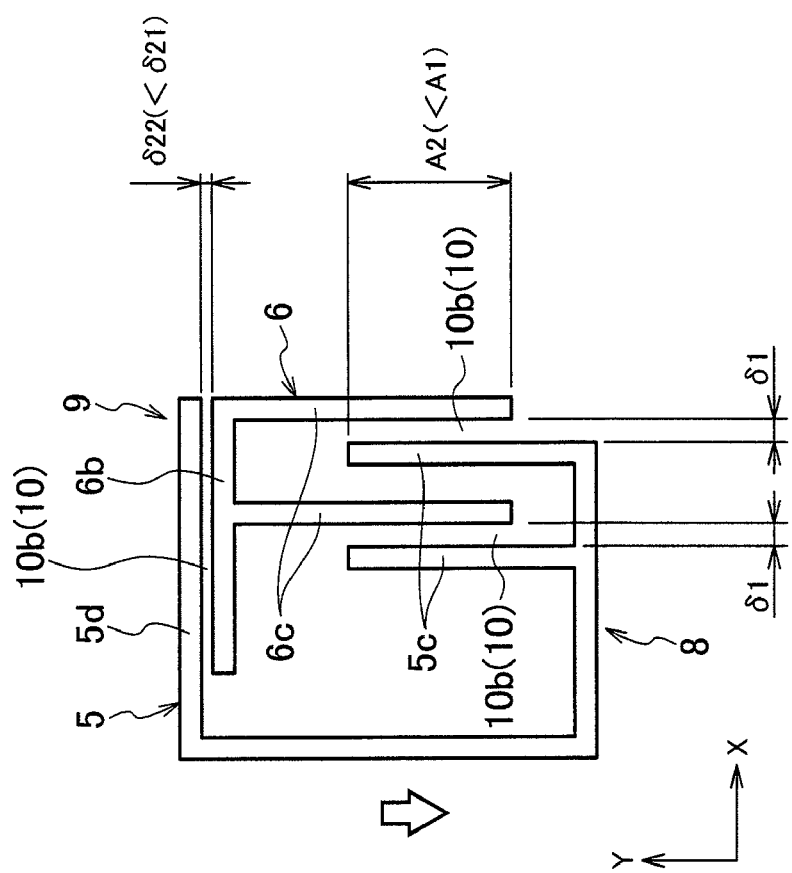
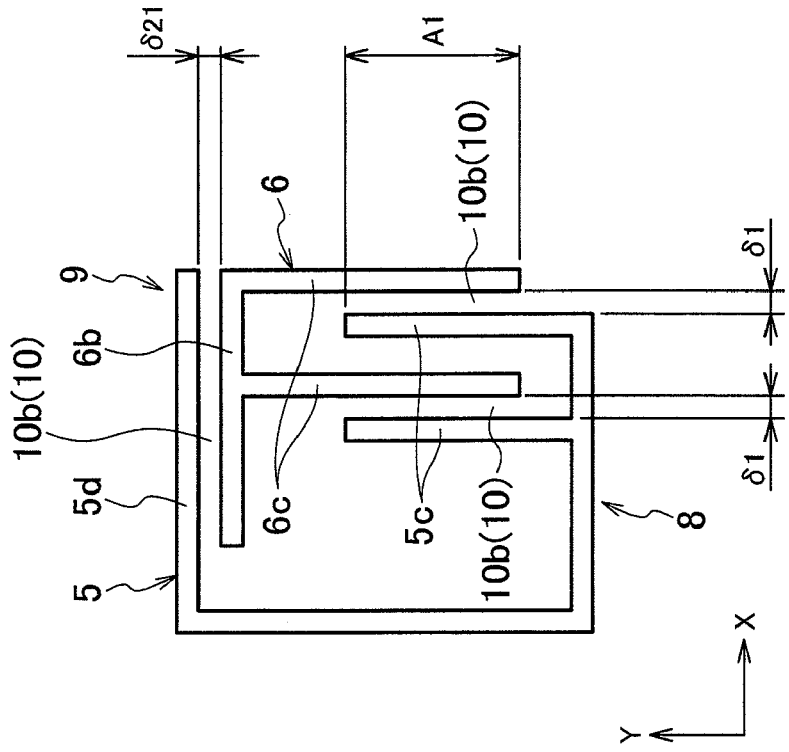

CAPACITIVE SENSOR

CROSS REFERENCE TO RELATED APPLICATION

This application is based upon and claims the benefit of priority from a Japanese Patent Application No. TOKUGAN 2006-089122, filed on Mar. 28, 2006; the entire contents of which are incorporated herein by reference.

BACKGROUND OF THE INVENTION

1. Field of the Invention

The present invention relates to a capacitive sensor that detects a predetermined physical quantity by detecting an amount of capacitance between a fixed electrode and a movable electrode.

2. Description of the Related Art

Conventionally, as disclosed in Japanese Patent Laid-Open Publication No. 2005-83972 (hereinafter, "Patent Document 1"), there has been known a capacitive sensor that is configured to have a structure such that a movable electrode is supported through an elastic element at a fixing portion by processing a semiconductor substrate with a well-known semiconductor process, so that the movable electrode contacts and separates from the fixed electrode according to an external force applied thereto, and is configured to detect various physical quantities, such as an acceleration rate and an angular speed, by detecting variation in capacitance between these electrodes.

In the capacitive sensor disclosed in Patent Document 1, detecting units to detect capacitance according to variation of a gap between the fixed electrode and the movable electrode are provided at four points in total. Each of the detecting units is structured that the fixed electrode and the movable electrode are opposed to each other in a manner that comb-tooth-shaped portions thereof engage with each other, keeping a predetermined gap therebetween.

However, the capacitive sensor disclosed in the Patent Document 1 is to detect variation in capacitance according to expansion and contraction of the gap between the fixed electrode and the movable electrode (that is, expansion and contraction of the width of a slit between comb-tooth-shaped portions, in the case of Patent Document 1), and if the fixed electrode and the movable electrode shift to be misaligned from each other (that is, to shift in a direction of length of a comb-tooth), the shift changes an area of a region in which the fixed electrode and the movable electrode are opposed to each other, thereby changing capacitance. Such variation of the capacitance leads to a detection error to degrade detection accuracy of the sensor.

It is an object of the present invention to provide a capacitive sensor that is capable of reducing detection errors due to shift of a fixed electrode and a movable electrode.

SUMMARY OF THE INVENTION

A capacitive sensor according to the present invention that has a fixed electrode and a movable electrode formed on a semiconductor layer, in which a detecting unit is structured that a portion of the fixed electrode and a portion of the movable electrode are opposed to each other keeping a gap therebetween, and that detects a predetermined physical quantity by detecting capacitance that varies according to a size of the gap includes an error compensating unit that, in an arrangement that another portion of the fixed electrode and another portion of the movable electrode are opposed to each other keeping another gap in a direction of shift of the detecting unit, reduces a detection error of the capacitance due to shift of the electrodes from each other in the detecting unit, by a change of capacitance according to variation of the other gap caused by the shift.

According to the capacitive sensor of the present invention, when the capacitance varies in the detecting unit because portions at which the fixed electrode and the movable electrode are opposed to each other shift from each other, the capacitance varies in the error compensating unit due to variation of the other gap according to the shift. Therefore, an amount of change in the capacitance in the detecting unit is reduced by an amount of change in the capacitance in the error compensating unit, thereby improving detection accuracy.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 3 is a partial enlarged view of FIG. 1;

FIGS. 4A and 4B are schematic diagrams of a fixed electrode and a movable electrode for explaining a structure and an action of an error compensating unit according to the embodiment.

DETAILED DESCRIPTION OF THE PREFERRED EMBODIMENTS

Embodiments of the present invention will be explained below with reference to the accompanying drawings.

Figure 1:
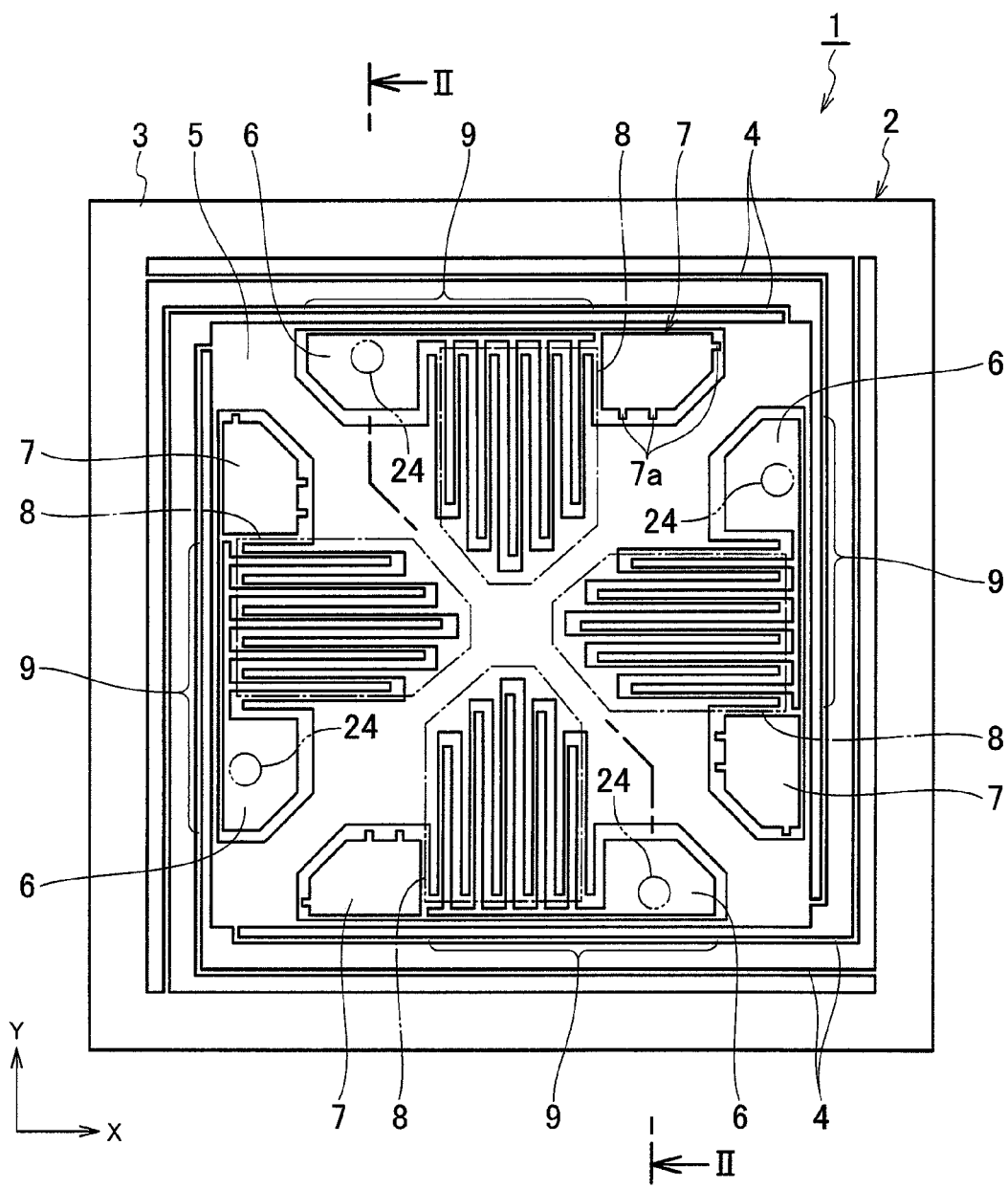
FIG. 1 is a plan view of a semiconductor layer of a capacitive sensor according to a first embodiment of the present invention.
Figure 2:
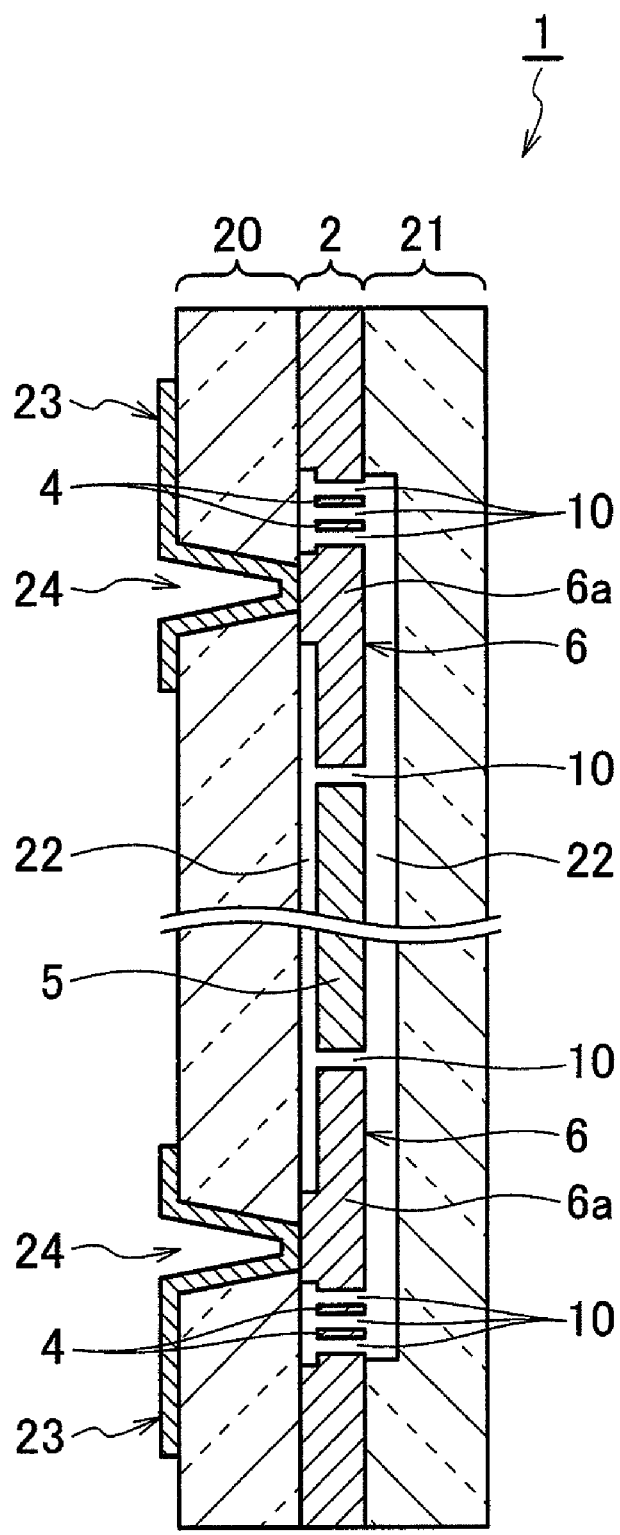
FIG. 2 is a cross-section of the capacitive sensor taken along a line II-II shown in FIG. 1.

FIG. 1 is a plan view of a semiconductor layer of a capacitive sensor according to one embodiment of the present invention, FIG. 2 is a cross-section of the capacitive sensor taken along a line II-II shown in FIG. 1, FIG. 3 is a partial enlarged view of FIG. 1, and FIGS. 4A and 4B are schematic diagrams of a fixed electrode and a movable electrode for explaining a structure and an action of an error compensating unit.

A capacitive sensor 1 according to the present embodiment is structured that insulation layers 20 and 21 of glass substrates and the like are connected by anodic bonding or the like to both sides of a semiconductor layer 2 that is formed by processing a semiconductor substrate. Relatively shallow concave portions 22 are formed on bonding surfaces between the semiconductor layer 2 and each of the insulation layers 20 and 21 to provide insulation at various portions of the semiconductor layer 2 and movability of a movable electrode 5.

Moreover, on a surface of the insulation layer 20, a conductive layer 23 is formed and used as an electrode to obtain electric potential of each portion of the semiconductor layer 2. In the present embodiment, through holes 24 are formed on the insulation layer 20 by sandblasting or the like so that a part of a surface (surface on a side of the insulation layer 20) of the semiconductor layer 2 is exposed, and an electrically connected one piece of the conductive layer 23 is formed over the surface of the insulation layer 20, an inner circumferential surface of the through hole 24, and the surface of the semiconductor layer 2 (surface of a fixed electrode 6 in the example shown in FIG. 2). Thus, it is configured that the electric potential of each portion of the semiconductor layer 2 is detected from the conductive layer 23. It is preferable to cover (mold) the surface of the insulation layer 20 with a resin layer (not shown).

As shown in FIGS. 2 and 3, gaps 10 are formed on the semiconductor substrate by a common semiconductor processing, and as a result, a frame portion 3, a beam portion 4, the movable electrode 5, a stopper portion 7, and the like are formed in the semiconductor layer 2.

The semiconductor layer 2 is, as shown in FIG. 2, formed in a substantially square shape as a whole, and the frame portion 3 is arranged in a frame form having a substantially constant width along four peripherals (four sides) of the semiconductor layer 2.

Inside this frame portion 3, the four beam portions 4 are arranged that extend respectively from four corners of the frame portion 3 in parallel to each side of the frame portion 3 while turning at right angles toward the center in a spiral manner. The beam portions 4 are arranged so as to extend along two sides of the frame portion 3 without interfering each other, and an inner-side end thereof is connected to an end of the movable electrode 5 so that the beam portions 4 function as a spring element (spiral spring) that elastically supports the movable electrode 5 to be movable with respect to the frame portion 3.

In other words, in the present embodiment, the movable electrode 5 is provided with a function as a mass element (mass) that is movably supported by the beam portions 4 as the spring element. With these spring element and mass element, a spring-mass system is established, and acceleration can be acquired from displacement of the movable electrode 5 as the mass element.

To detect the displacement of the movable electrode 5, in the present embodiment, a detecting unit 8 is structured by arranging a portion of the movable electrode 5 and a portion of the fixed element 6 so as to be opposed to each other keeping a gap therebetween. By detecting capacitance between the movable electrode 5 and the fixed electrode 6 in the detecting unit 8, a change of the gap, that is, the displacement of the movable electrode 5 with respect to the fixed element 6 is detected.

Specifically, as shown in FIG. 3, the movable electrode 5 includes comb-tooth portions 5c that extend in a form of thin belt from a central portion 5a toward a central part of one side of the frame portion 3 in a direction substantially perpendicular to the side. In the present embodiment, the comb-tooth portions 5c are arranged in parallel to each other at regular pitches. While ends of the respective comb-tooth portions 5c are aligned, the comb-tooth portions 5c are formed so as to have longer length as a position thereof shifts toward the innermost of the cluster, and shorter length as the position thereof shifts toward the outermost of the cluster.

On the other hand, the fixed electrode 6 includes a corner portion 6a that is arranged adjacently to the movable electrode 5, and an edge portion 6b that extends in a form of thin belt from this corner portion 6a along one side of the frame portion 3. To this edge portion 6b, comb-tooth portions 6c that extend toward the central portion 5a of the movable electrode 5 are connected. In the present embodiment, the comb-tooth portions 6c are arranged in parallel to each other at regular pitches (the same pitch as that of the comb-tooth portions 5c of the movable electrode 5) so as to engage with the comb-tooth portions 5c of the movable electrode 5 keeping the gap 10. The comb-tooth portions 6c also are formed so as to have longer length as a position thereof shifts toward the innermost of the cluster, and shorter length as the position thereof shifts toward the outermost of the cluster, corresponding to the comb-tooth portions 5c of the movable electrode 5, and are arranged so as to keep as large area as possible in which the comb-tooth portions 5c and 6c are opposed to each other.

In the detecting unit 8, the gap 10 between the comb-tooth portions 5c and 6c is arranged to be small on one side (gap 10a), and large on another side (gap 10c) with respect to the comb-tooth portions 5c. The gap 10a of the small gap side is used as a detecting gap, and capacitance between the comb-tooth portions 5c and 6c opposed to each other through the gap 10a, that is, the capacitance between the fixed electrode 6 and the movable electrode 5 is detected.

As shown in FIG. 1, the detecting unit 8 is provided at the central part of each side of the frame portion 3, and the detecting unit 8 for X-direction detection (detecting units 8 at the top and the bottom in FIG. 2) and the detecting unit 8 for Y-direction detection (detecting units 8 at the right and the left in FIG. 2) are provided at two points each.

Moreover, as shown in FIGS. 2 and 3, the through hole 24 is formed in the insulation layer above the corner portion 6a of the fixed electrode 6, and it is configured that the electric potential of the fixed electrode 6 is acquired through the conductive layer 23 formed on the inner circumferential surface of the through hole 24. In the insulation layer 20, a through hole and a conductive layer (both not shown) that are same as those shown in FIG. 2 are formed at two points positioned on a diagonal line between a pair of corners among four corners of the frame portion 3 so that the electric potential of the movable electrode 5 is acquired through the conductive layer formed in the four beam portions 4, the frame portion 3, and the through hole. The frame portion 3 can be regarded as an electrode integrally formed with the movable electrode 5.

In the detecting unit 8 of the above structure, when the comb-tooth portions 5c and 6c shift from each other in a direction of length (in other words, direction perpendicular to the direction of detection; another axial direction), the area in which the comb-tooth portions 5c and 6c are opposed to each other fluctuates, thereby changing the capacitance. Such a change in the capacitance is not because of the displacement in the detection target direction (direction of detection), but is a detection error.

Therefore, in the present embodiment, an error compensating unit 9 is structured by arranging a part of the fixed electrode (the edge portion 6b; another portion) and a part of the movable electrode 5 (the edge portion 5b; another portion) so as to be opposed to each other keeping a predetermined gap (10b; another gap) in a direction of the shift of the comb-tooth portions 5c and 6c. By this error compensating unit 9, the detection error of the capacitance in the detecting unit 8 is reduced.

Specifically, an edge portion 5d is formed outside the edge portion 6b of the fixed electrode 6 so that the edge portion 5d extends in a form of thin belt in parallel to the edge portion 6b, in other words, in a direction of width of the detection gap (gap 10a) of the detecting unit 8 (extending direction of the comb-tooth portions 5c and 6c; shifting direction of the comb-tooth portions 5c and 6c; X direction for the detecting unit 8 shown in FIG. 3), and it is structured that capacitance between the edge portions 5d and 6b varies according to the size of the gap 10b.

In the present embodiment, the edge portion 5d that extends along a side of the frame portion 3 is laid between two corner portions 5b of the movable electrode 5 in a manner that the movable electrode 5 surrounds the fixed electrode 6. Therefore, with such a structure that an inner side surface of the edge portion 5d of the movable electrode 5 and an outer side surface of the edge portion 6b of the fixed electrode 6 are opposed to each other, a structure to form the error compensating unit 9 is obtained remarkably easily.

In particular, with an arrangement that the edge portion 5d forming the error compensating unit 9 is laid between the two corner portions 5b, the edge portion 5d is supported at both ends, thereby making it easy to secure rigidity and strength of the edge portion 5d compared to the case of being supported at only one side. Accordingly, there is an advantage that the movable electrode 5 can be further downsized and light-weighted.

In the semiconductor layer 2, the stopper portion 7 is arranged that is not connected to either of the movable electrode 5 or the fixed electrode 6, to prevent collision of the movable electrode 5 and the fixed electrode 6 to be damaged. In the present embodiment, protrusions 7a are appropriately provided on a side of the stopper portion 7 opposed to the movable electrode 5.

An action of the error compensating unit 9 is explained with reference to FIGS. 4A and 4B. In contrast to a state shown in FIG. 4A in which the comb-tooth portions 5c and 6c are not shifted in a direction along a surface at which the comb-tooth portions 5c and 6c are opposed to each other (i.e. direction of length of the gap 10b) in the detecting unit 8, when the movable electrode 5 shifts downward in a Y direction as shown in FIG. 4B, an opposed area in which the comb-tooth portions 5c and 6c that function as the electrodes in the detecting unit 8 are opposed to each other decreases from A1 to A2 (<A1) while a space of the gap 10b between the edge portions 5d and 6b function as the electrodes in the error compensating unit 9 decreases from δ21 to δ22 (<δ21).

Capacitance C between two electrodes opposed to each other is expressed as C=∈×S/d (where ∈: dielectric constant, S: opposed area, d: gap size). Therefore, in the detecting unit 8, as the opposed area of the electrodes decreases according to the shift, the capacitance decreases by ΔC1=∈×(A1−A2)/δ1. On the other hand, in the error compensating unit 9, as the gap between the electrodes becomes smaller according to the shift, the capacitance increases by ΔC2=∈×A3/(δ21−δ22) (where A3: opposed area of the edge portions 5d and 6b in the error compensating unit 9). Therefore, if specifications (gap, opposed area, etc.) of the error compensating unit 9 (or the detecting unit 8) is set so as to be ΔC1≈C2, a change (a detection error) of the capacitance caused by the shift in the detecting unit 8 can be reduced by a change in the capacitance caused by the shift in the error compensating unit 9.

According to the present embodiment, by arranging a part of the fixed electrode 6 as the edge portion 6d and a part of the movable electrode 5 as the edge portion 5d to be opposed to each other keeping the gap 10b in the direction of the shift of the detecting unit 8, the error compensating unit 9 is structured that reduces the detection error of the capacitance due to the shift between the electrodes in the detecting unit 8 by a change of the capacitance according to a change of the gap 10b due to the shift, thereby improving detection accuracy.

In this case, it should be structured that the gap 10b becomes smaller as the area in which the fixed electrode 6 and the movable electrode 5 are opposed to each other becomes smaller in the detecting unit 8.

Furthermore, in the present embodiment, it is arranged such that the fixed electrode 6 is surrounded by the movable electrode 5. Therefore, the error compensating unit 9 can be obtained remarkably easily as a portion at which the inner side surface of the edge portion 5d of the movable electrode 5 and the outer side surface of the edge portion 6b of the fixed electrode 6 are opposed to each other keeping the gap 10b therebetween.

Particularly, with an arrangement that the edge portion 5d forming the error compensating unit 9 is laid between the two corner portions 5b of the movable electrode 5, the edge portion 5d is supported at both ends, thereby making it easy to secure rigidity and strength of the edge portion 5d compared to the case of being supported at only one side. Accordingly, there is an advantage that the movable electrode 5 can be further downsized and light-weighted.

Figure 5:
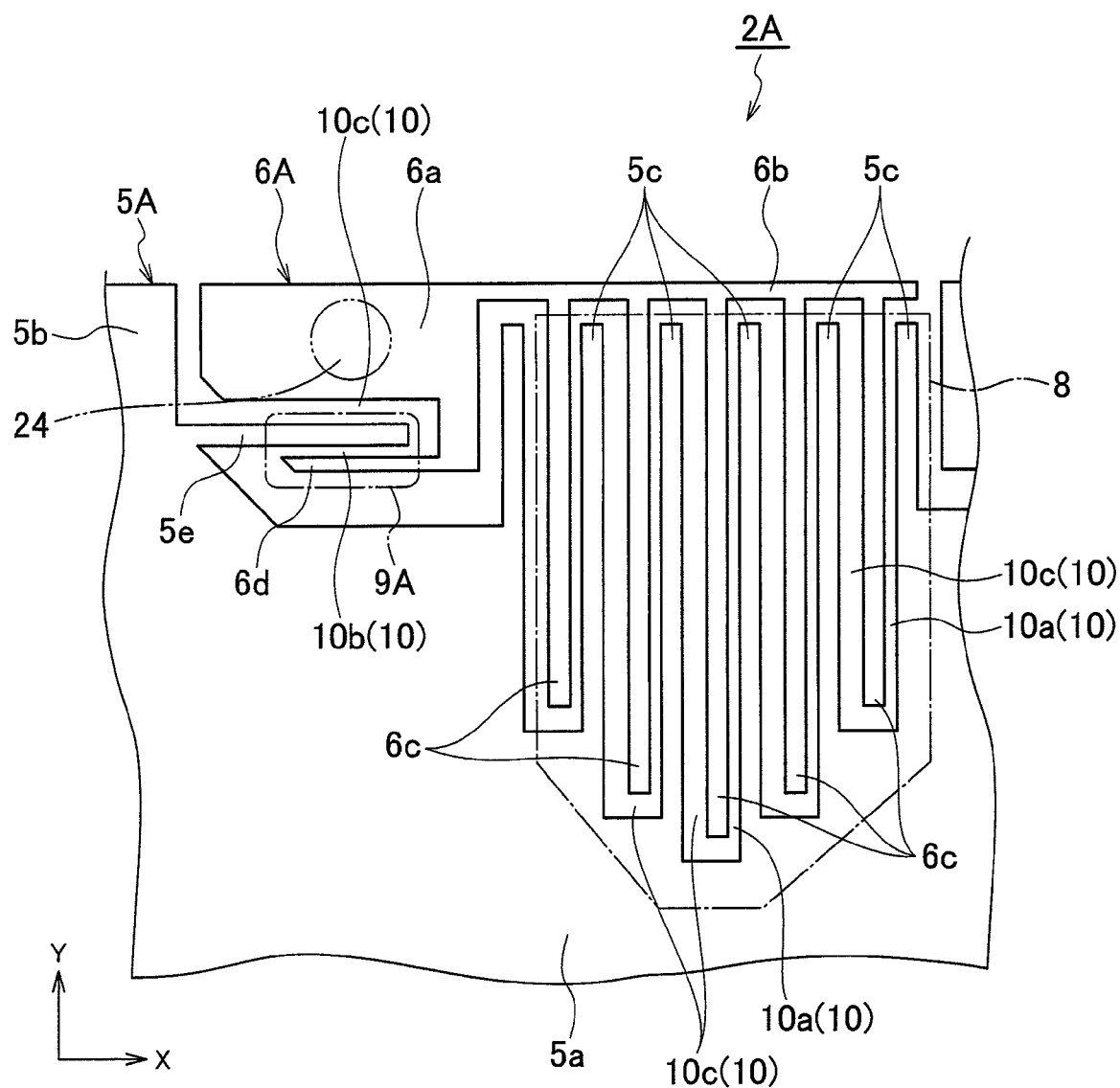
FIG. 5 is a partial enlarged view of a semiconductor layer of a capacitive sensor according to a second embodiment of the present invention.

FIG. 5 is a partial enlarged view of a semiconductor layer of a capacitive sensor according to a second embodiment of the present invention. The capacitive sensor according to the present embodiment has similar components as the capacitive sensor according to the first embodiment described above. Therefore, like reference characters are given to common constituent elements and redundant explanations will be omitted.

As shown in FIG. 5, the detecting unit 8 same as that of the first embodiment is formed in a semiconductor layer 2A according to the present embodiment.

In the present embodiment, bar portions 5e and 6d are provided to both of the fixed electrode 6 and the movable electrode 5, and by arranging these bar portions 5e and 6d so as to be opposed to each other keeping the predetermined gap 10d, the error compensating unit 9 is structured. As shown in FIG. 5, the bar portions 5e and 6d extend in a form of thin belt in a direction of width of the detection gap (gap 10a) of the detecting unit 8 (extending direction of the comb-tooth portions 5c and 6c; shifting direction of the comb-tooth portions 5c and 6c; X direction for the detecting unit 8 shown in FIG. 5), and it is structured that capacitance between the bar portions 5e and 6d varies according to the size of the gap 10b.

Therefore, according to the present embodiment, the detection error caused by the shift of the electrodes in the detecting unit 8 can be reduced by the action of the error compensating unit 9A, with the same principle as that of the first embodiment.

While preferred embodiments of the present invention have been explained herein, this invention is not limited thereto, and various modifications can be made.

The capacitive sensor according to the present invention can be configured as a sensor to detect various physical quantities not being limited to acceleration as long as the detection error due to the shift of displacement is reduced.

Moreover, the structure and the arrangement of the detecting unit and the error compensating unit are not limited to those of the above embodiments, as long as it is structured that the gap between the fixed electrode and the movable electrode becomes smaller as the area in which the fixed electrode and the movable electrode are opposed to each other becomes smaller in the detecting unit.

Furthermore, while in the second embodiment, the bar portions are provided to both of the fixed electrode and the movable electrode, as long as the bar portion is provided to either one of the electrodes and a region that can be arrange to be opposed to a side of the bar portion keeping a gap is provided to the other one, it is not essential to be formed in a bar portion.

What is claimed is:

1. A capacitive sensor that has a fixed electrode and a movable electrode formed on a semiconductor layer, in which a detecting unit is structured that a portion of the fixed electrode and a portion of the movable electrode are opposed to each other keeping a gap therebetween, and that detects a predetermined physical quantity by detecting capacitance that varies according to a size of the gap, comprising an error compensating unit that, in an arrangement that another portion of the fixed electrode and another portion of the movable electrode are opposed to each other keeping another gap in a direction of a shift of the detecting unit, reduces a detection error of the capacitance due to a shift of the electrodes from each other in the detecting unit, by a change of capacitance according to a variation of the other gap caused by the shift, wherein the error compensating unit is arranged as another detecting unit, and each detecting unit outputs signals independently from the other.

2. The capacitive sensor according to claim 1, wherein as an area in which the fixed electrode and the movable electrode are opposed to each other in the detecting unit decreases according to the shift, the other gap decreases.

3. The capacitive sensor according to claim 2, wherein the movable electrode is arranged so as to surround the fixed electrode, and a portion at which a portion of an inner side surface of the movable electrode and a portion of an outer side surface of the fixed electrode are opposed to each other is formed as the error compensating unit.

4. The capacitive sensor according to claim 2, wherein a bar portion is provided to one of the fixed electrode and the movable electrode, and the bar portion and a portion that is arranged to be opposed to the bar portion keeping a predetermined gap therebetween are formed as the error compensating unit.

5. The capacitive sensor according to claim 1, wherein the movable electrode is arranged so as to surround the fixed electrode, and a portion at which a portion of an inner side surface of the movable electrode and a portion of an outer side surface of the fixed electrode are opposed to each other is formed as the error compensating unit.

6. The capacitive sensor according to claim 1, wherein a bar portion is provided to one of the fixed electrode and the movable electrode, and the bar portion and a portion that is arranged to be opposed to the bar portion keeping a predetermined gap therebetween are formed as the error compensating unit.

* * * * *